United States Patent [19]

Hjortsberg et al.

[11] Patent Number: 5,061,554
[45] Date of Patent: * Oct. 29, 1991

[54] ELECTRICAL INSULATING MATERIAL COMPRISING AN INSULATING LAYER IN THE FORM OF AN ORGANIC POLYMER

[75] Inventors: Arne Hjortsberg; Göran Holmström; Lennart Johansson, all of Västerås; Thommy Karlsson, Bävlinge, all of Sweden

[73] Assignee: Asea Brown Boveri AB, Västeråas, Sweden

[*] Notice: The portion of the term of this patent subsequent to Jun. 19, 2007 has been disclaimed.

[21] Appl. No.: 171,440

[22] Filed: Mar. 21, 1988

[30] Foreign Application Priority Data

Mar. 24, 1987 [SE] Sweden .................................. 8701213

[51] Int. Cl.$^5$ ........................ B32B 27/08; B32B 27/18; H01B 7/28
[52] U.S. Cl. .................................... 428/220; 428/290; 428/328; 428/329; 428/383; 428/384; 428/389; 428/425.9; 428/473.5; 428/474.4; 428/480; 174/110 SR; 174/110 N; 174/120 SR; 524/431
[58] Field of Search ............... 428/213, 328, 220, 290, 428/329, 383, 384, 389; 524/407, 431; 174/110 SR, 110 N, 120 SR

[56] References Cited

U.S. PATENT DOCUMENTS

| 2,875,098 | 2/1959 | Blatz | 524/407 |
| 4,537,804 | 8/1985 | Keane et al. | 427/118 |
| 4,688,142 | 8/1987 | Hjortsberg et al. | 361/332 |
| 4,760,296 | 7/1988 | Johnston et al. | 310/45 |
| 4,935,302 | 6/1990 | Hjortsberg et al. | 428/383 |

Primary Examiner—George F. Lesmes
Assistant Examiner—Christopher Brown
Attorney, Agent, or Firm—Watson, Cole Grindle & Watson

[57] ABSTRACT

A tape-formed or sheet-formed insulating material for use in windings and coils of electrical machines includes an insulating layer in the form of a homogeneous film of an organic polymer or in the form of a felt of a paper of fibres of an organic polymer and a protective layer coated on at least one side of the insulating layer which protects the insulating layer against degradation caused by corona. The protective layer comprises an organic polymer containing at least 10 percent by volume of a powdered filler in the form of chromium oxide, iron oxide or a mixture of chromium oxide and iron oxide. The filler preferably has an intrinsic resistivity of $10^4$–$10^8$ ohm m. The thickness of the protective layer and the total thickness of the protective layer, respectively, are preferably smaller than the thickness of the insulating layer and the resistivity of the protective layer is preferably in excess of $10^{10}$ ohm m.

26 Claims, 1 Drawing Sheet

ELECTRICAL INSULATING MATERIAL COMPRISING AN INSULATING LAYER IN THE FORM OF AN ORGANIC POLYMER

BACKGROUND AND SUMMARY OF THE INVENTION

The present invention relates to a tape- or sheet-formed electrical insulating material comprising an insulating layer in the form of a homogeneous film of an organic polymer or in the form of a felt or a paper of fibres of an organic polymer.

Films of organic polymers and felts of fibres of organic polymers generally have a very high electrical strength. In many cases, however, their usefulness as electrical insulating materials is limited by a high sensitivity to corona (partial discharges).

According to the present invention it has been found to be possible to protect such films and felts against corona damage so that they can withstand corona for a considerably longer period of time than previously. According to the invention, this is achieved by arranging on one or both sides of the film or felt a layer of an organic polymer containing a sufficient quantity of at least one of the substances chromium oxide and iron oxide in powder form.

One possible explanation of the favourable results obtained according to the present invention may be that the corona sputters away insulating polymer materials from the mentioned layer and that the chromium oxide or iron oxide thus exposed, because of its lower resistivity, increases the electrical conductivity locally on the surface sufficiently for the extremely concentrated effect of a corona discharge to spread over a larger surface and hence be effectively reduced.

More particularly, the present invention relates to a tape-formed or sheet-formed electrical insulating material comprising an insulating layer in the form of a homogeneous film of an organic polymer, or in the form of a felt or a paper of fibres of an organic polymer, which is characterized in that the insulating layer, at least on one side thereof, is coated with a protective layer which protects the insulating layer against a degradation caused by corona and which comprises an organic polymer containing at least 10 percent by volume of a powdered filler in the form of chromium oxide ($Cr_2O_3$), iron oxide ($Fe_2O_3$) or a mixture of chromium oxide ($Cr_2O_3$) and iron oxide ($Fe_2O_3$). The powdered filler preferably has an intrinsic resistivity of $10^4$–$10^8$ ohm m.

The protective layer containing the filler or the protective layers together, if one protective layer is arranged on each side of the polymer film, preferably has/have a thickness which is smaller than the thickness of the insulating layer.

The protective layer preferably has a resistivity exceeding $10^{10}$ ohm m.

Chromium oxide is preferred as filler because of its property of giving the protective layer a corona resistance which is not—or only insignificantly—reduced by the influence of external factors, such as moisture. The particle size of the powdered filler is suitably 0.005–30 $\mu$m, and preferably 0.005–5 $\mu$m. The content of the powdered filler suitably amounts to 10–40% of the volume of the protective layer. Particularly preferred is a content of powdered filler of 10–30% of the volume of the protective layer.

The organic polymer in the insulating layer, if this consists of a polymer film, may, among other things, be of polyimide, polyamide, polyamideimide, polyethyleneglyclol terephthalate, polycarbonate, polysulphon, polypropylene and polymethyl pentene.

The organic polymer in the fibres in the insulating layer, if this consists of a felt or a paper, may, among other things, be of polyethyleneglycol terephthalate, of an aromatic polyamide, of an aliphatic polyamide, of polypropylene, or of cellulose. Such felts are usually kept together by the fibres being felted together without orientation and possibly calendered.

The organic polymer in the protective layer may, among other things, consist of a resin normally used for enamelling electrical conductors or for impregnating electrical windings such as terephthalic acid alkyds, polyesterimides, polyamideimides, polyimides, polyurethanes, epoxy resins, polysulphons, silicones, polyamides, polymers based on polyhydantoin and unsaturated polyester resins and which has been converted into solid state.

The thickness of the protective layer, or the total thickness of the protective layers when using two protective layers, suitably amounts to 5–100 $\mu$m, preferably to 10–50 $\mu$m, and the thickness of the insulating layer suitably to 10–500 $\mu$m, and preferably to 10–200 $\mu$m.

An electrical insulating material according to the present invention is suited, among other things, as an insulating material for insulation of electrical conductors, as an insulating material in insulations between winding and machine slots in electrical machines using form wound coils, as slot insulation between winding and machine slots in machines using random wound coils, and as phase insulation between coils for different phases in the latter machines.

The invention will be explained in greater detail by describing examples with reference to the accompanying drawings:

EXAMPLE 1

Figure 1:
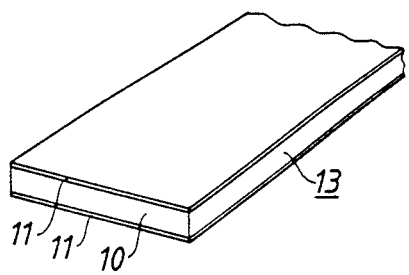
FIGS. 1 and 2 show insulating materials according to the present invention in greatly exaggerated thickness.

A film of polyethyleneglycol terephthalate 10 according to FIG. 1 with a thickness of 125 $\mu$m is coated on one side or on both sides by means of spray coating with a protective layer 11 with a thickness of 50 $\mu$m, and with a thickness of both coatings together of 50 $\mu$m, respectively. The protective layer consists of an epoxy resin and 30% of its volume consists of chromium oxide ($Cr_2O_3$) with a particle size of less than 5 $\mu$m. The epoxy resin used for the application of the protective layer may consist of 100 parts by weight of an epoxy resin of bisphenol A-type containing 5.15–5.5 moles epoxy groups per kg (e.g. Epikote 828 from Shell, Holland), and 50 parts by weight curing agent of amino type with an amino value of 400–460 mg KOH/g, dissolved in equal parts xylene and butanol. The epoxy resin contains 30 percent by volume chromium oxide, calculated on the solid constituents of the resin without solvent. The curing of the resin is carried out at 150° C. for two hours. The finished insulating material is designated 13 in FIG. 1.

EXAMPLE 2

A film 10 of the same kind as in Example 1 is coated on one side or on both sides by means of spray coating with a 50 μm thick protective layer 11 of a polyurethane resin. Of the volume of the protective layer 20% consists of chromium oxide with a particle size of less than 5 μm. The polyurethane varnish used for the application may consist of a mixture of 264 parts by weight of a polyole, for example Desmophen 1652 from Bayer AG, Fed. Rep. of Germany, 236 parts by weight of an isocyanate, for example Desmodur CT Stabil from Bayer AG, dissolved in 225 parts by weight cyclohexanone, 50 parts by weight methylethyl ketone and 225 parts by weight xylene. In addition, the varnish contains 2.5 parts by weight zinc octoate. The content of chromium oxide constitutes 20% of the volume of the constituents of the varnish without solvent. The varnish is cured at 140° C. for three hours.

EXAMPLE 3

A film 10 of polyimide (e.g. Kapton ® from Du Pont, U.S.A) with a thickness of 75 μm is provided in accordance with FIG. 1 on one side or on both sides with a protective layer 11 of polyesterimide with a thickness of 25 μm and with a thickness of both coatings together of 50 μm, respectively. Of the volume of the protective layer 25% consists of chromium oxide. The polyesterimide varnish used for the application of the protective layer 11 may, for example, consist of Terebec ® 533L-33 from BASF, Fed. Rep. of Germany, containing 25 percent by volume of chromium oxide calculated on the constituents of the varnish without solvent with a particle size of less than 5 μm. The varnish can be applied by spraying or varnishing using rolls in one or more steps, in the latter case by means of passage through a heating device with a temperature of about 400° C. between each addition of a new varnish layer.

EXAMPLE 4

Figure 2:
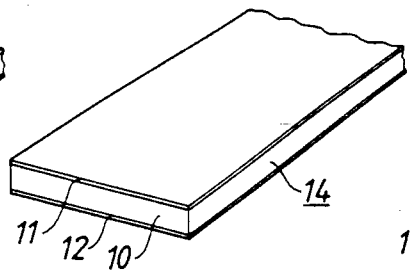

A film (e.g. Kapton ® Type F from Du Pont, U.S.A), which in accordance with FIG. 2 is built up of a layer 10 of polyimide with a thickness of 50 μm and a layer 12 of fluorinated ethylenepropylene polymer (e.g. Teflon FEP ® from Du Pont, U.S.A) with a thickness of 12 μm, is provided with a protective layer 11 of the kind described in Example 3 in the manner stated in Example 3. Of the volume of the protective layer 25% consists of chromium oxide. The finished insulating material is designated 14 in FIG. 2.

EXAMPLE 5

A two-layer film 10, 12 of the kind described in Example 4 is provided with a protective layer 11 of a polyamideimide containing 15 percent by volume chromium oxide with a particle size of less than 5 μm. The polyamideimide varnish used for the application of the protective layer may, for example, consist of Lack E 3561/27 from Herberts GmbH, Fed. Rep. of Germany, containing 15 percent by volume chromium oxide, calculated on the constituents of the varnish without solvent. The varnish can be applied in the manner described in Example 3.

EXAMPLE 6

A film 10 according to FIG. 1 of polycarbonate (e.g. Makrofol ® Type KG from Bayer AG) with a thickness of 60 μm is coated on one side or on both sides with a protective layer 11 with a thickness of 20 μm and with a thickness of both coatings together of 40 μm, respectively. The protective layer is of the same kind as in Example 1 and is applied in the same way as described there.

EXAMPLE 7

A film 10 according to FIG. 1 of a polycarbonate (e.g. Makrofol ® Type KG from Bayer AG) with a thickness of 60 μm is coated on one side or on both sides with a protective layer 11 with a thickness of 20 μm and with a thickness of both coatings together of 40 μm, respectively. The protective layer is of the same kind as in Example 2 and is applied in the same way as described there.

EXAMPLE 8

A felt 10 of short fibres of an aromatic polyamide (e.g. Nomex ® 410 from Du Pont, U.S.A) with a thickness of 80 μm is coated in accordance with FIG. 1 on one side or on both sides with a protective layer 11 with a thickness of 30 μm and with a thickness of both coatings together of 60 μm, respectively. The protective layer is of the same kind as in Example 1 and is applied in the same way as described there.

EXAMPLE 9

A felt 10 of short fibres of an aromatic polyamide (e.g. Nomex ® 410 from Du Pont, U.S.A) with a thickness of 80 μm is coated in accordance with FIG. 1 on one side or on both sides with a protective layer 11 with a thickness of 30 μm and with a thickness of both coatings together of 60 μm, respectively. The protective layer is of the same kind as in Example 2 and is applied in the same way as described there.

Instead of chromium oxide ($Cr_2O_3$) there may be used in the cases exemplified above an equally great percentage by volume of iron oxide ($Fe_2O_3$) with the same size of the grains, as well as an equally great percentage by volume of a mixture of iron oxide and chromium oxide in arbitrary proportions, for example in equal parts by weight.

Figure 3:
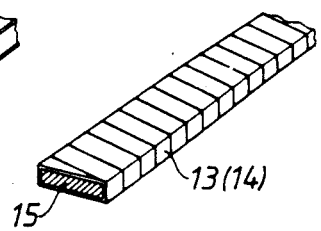
FIG. 3 shows an electrical conductor which is insulated with an insulating material according to the present invention.

An application of the insulating material according to the present invention is shown in FIG. 3. A conductor 15 of rectangular cross-section, 3 mm × 10 mm, is wound with half an overlap with a tape-formed insulating material 13 according to any of Examples 1-3 and 6-9 with a width of 15 mm, whereby, if a tape with one protective layer 11 is used, the side with the protective layer faces outwards. That side of the tape which faces the conductor is provided with an adhesive, for example in the form of a polyamide-modified epoxy resin (such as AF-42 from Minnesota Mining and Manufacturing Company, U.S.A), which has been cured by heating to 160° C. after the winding has been applied around the conductor. When using a tape-formed insulating material 14 according to Examples 4 or 5, the layer 12 of fluorinated ethylenepropylene is utilized as an adhesive. This layer is facing the conductor 15. The attachment of the winding takes place by heating the layer 12 to a temperature of 270° C. Instead of winding the tape helically, it may be folded around the conductor while forming a longitudinal joint.

A conductor according to FIG. 3 or a conductor with the tape folded into a longitudinal joint is very well suited for use, among other things, in form wound coils for electrical machines for operating voltages in excess of 3 kV. In such coils there are normally arranged around the conductor insulation layers of mica to render the conductor insulations resistant to the attack of corona. When using conductors according to the present one in such coils, it is possible to make the insulation and the corona protection around the conductor considerably thinner than when using the known corona-resistant conductor insulation. In that way more conductor material may be incorporated in the coil and for a certain machine dimension a greater power be attained; also, for a certain power, the machine dimension may be reduced.

A coil of the above kind comprises a bundle of several adjacently arranged lengths of a conductor of the described kind and a main insulation surrounding the conductor bundle for insulation of the bundle against the machine slot.

The conductor bundle may consist of several turns of one single insulated conductor which has been bent while forming the final shape of the bundle. It may also consist of several separate insulated conductors, which at their ends are electrically connected to each other, usually parallel-connected. Particularly great advantages are obtained according to the invention for the former type of conductor bundle, since the stresses between adjacent conductors are in this case greater and a short-circuit caused by a damaged conductor insulation is more serious.

The main insulation may be formed in different, previously well-known ways. Thus, it may consist of a wrapping of mica tapes or mica sheets. These may be made of large mica flakes of conventional kind which are attached to a carrier material of paper, woven glass fibre or the like, for example with a resinous binder such as an alkyd resin or a thin thermoplastic film. The mica materials may also consist of self-supporting tapes or sheets of small mica flakes, overlapping each other, manufactured by splitting of ordinary mica, these mica materials then usually also being attached to a carrier material.

On the mentioned mica tapes or mica sheets there may be applied a resinous binder which subsequently, when the materials are applied around the conductor bundle, binds the various layers in the insulation of the conductor to each other. Such a binder, however, may be supplied after the insulating material has been applied around the conductor bundle by an impregnation process. As examples of suitable binders for the turns in the wrapping may be mentioned solvent-free resins such as epoxy resins and unsaturated polyester resins.

Figure 4:
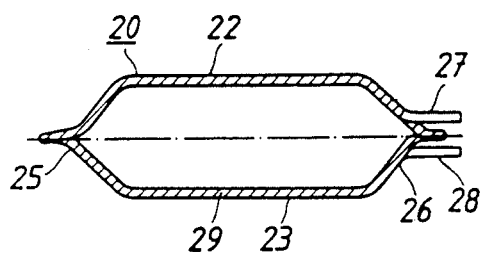
FIG. 4 shows a side view of a form wound coil for an electrical machine in which is used an insulating material according to the present invention.
Figure 5:
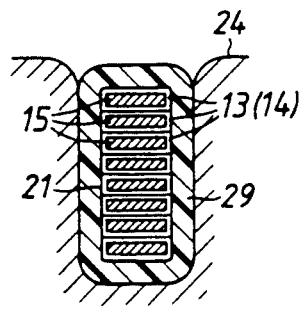
FIG. 5 shows the same coil in cross-section.

A conductor of the kind shown in FIG. 3, or a conductor with an insulating tape folded in the described manner, is bent into a coil containing several turns of the conductor placed side-by-side as shown in FIGS. 4 and 5, respectively. These turns positioned side-by-side form the conductor bundle 21 of the coil 20. As will be clear from FIG. 4, the bending is carried out such that the coil has straight parts 22 and 23 intended to be positioned in the slots 24 of the machine, as well as bent end parts 25 and 26 which extend outside the slots. The terminals of the coil are designated 27 and 28.

The conductor bundle 21 is then wound turn-by-turn with, for example, half an overlap with a 25 mm wide mica tape consisting of a 0.09 mm thick self-supporting layer of small mica flakes which overlap each other and are fixed to an 0.04 mm thick woven glass fibre tape with an 0.006 mm thick polyethyleneglycol terephthalate foil. Such an insulating tape is described in Swedish Patent 200,820. When the bundle has been provided with a wrapping 29 of, for example, twenty layers of the mica tape placed on top of each other, the winding is first dried at a pressure of 0.1 mm Hg and at a temperature of 40° C., whereupon an impregnating resin is supplied at this pressure. When all impregnating resin has been supplied, the pressure is raised to, for example, 10 kn/cm$^2$. The resin may consist of 100 parts by weight of an epoxy resin, which in a known manner has been produced of epichlorhydrin and 4,4'-dioxydiphenyl-dimethyl methane and which has an epoxy equivalent of 192, and 100 parts by weight of a curing agent consisting of a mixture of 75 parts by weight hexahydrophthalic acid anhydride and 25 parts by weight tetrahydrophthalic acid anhydride. In order for the resin not to penetrate out of the insulation during the subsequent curing operation, the impregnated conductor bundle with the mica tape wrapping may be surrounded by a sealing tape of polytetrafluoroethylene or the like. The coil is then placed in a forming tool for curing the resinous material. The curing takes place at a temperature of about 160° C. for a period of about 10 hours.

In an alternative embodiment a coil is manufactured using a mica tape which is impregnated with impregnating resin prior to its winding around the bundle 21 (FIG. 5), which may be of the same kind as in the above example. The resin contains an unsaturated polyester resin manufactured of adipic acid (11 mole percent), phthalic acid anhydride (11 mole percent), maleic acid anhydride (23 mole percent), and ethylene glycol (55 mole percent), to which have been added, on the one hand, diallyl phthalate in such an amount that the diallyl phthalate constitutes 40% of the total weight of polyester resin and diallyl phthalate and, on the other hand, bensoyl peroxide in an amount corresponding to 1% of the weight of the entire resin. The polyester resin itself can be manufactured by reaction of a mixture of the mentioned acids and the alcohol in inert atmosphere by increasing the temperature to 220° C. and maintaining this temperature until the acid value of the reaction product is about 30. Prior to the impregnation of the mica tape, 100 parts by weight of the resin is diluted with 100 parts by weight acetone. The mica tape, which may be of the same kind as that described above, can be impregnated with the resinous material at room temperature and at atmospheric pressure. The impregnated mica tape is wound, after driving off the solvent, around the conductor bundle 21 with half an overlap into thirty layers placed one above the other to form the main insulation 29. The coil is then placed in a forming tool for curing the resinous material at a temperature of 160° C. for a period of three hours.

Although many unsaturated polyester resins and epoxy resins suited for impregnation of electrical insulations are known, a few additional examples of such resins will be mentioned. Thus there may be used, for example, a polyester resin consisting of 60 parts by weight of a reaction product of 3 moles maleic acid anhydride, 1 mole adipic acid and 4.4 moles ethylene glycol with an acid number of 30, and of 40 parts by weight diallyl phthalate and containing 0.75% bensoyl peroxide and a polyester resin consisting of 70 parts by weight of a reaction product of 1 mole fumaric acid, 1 mole phthalic acid and 2.2 moles propylene glycol with an acid number of 25, and of 30 parts by weight monostyrene and containing 0.5% bensoyl peroxide, as well as an epoxy resin consisting of 100 parts by weight "Epon 828" (Shell Chemical Co.) and 65 parts hexahydrophthalic acid anhydride, an epoxy resin consisting of 85 parts by weight "Araldit F", 100 parts by weight "Curing agent 905" (both from Ciba AG, Switzerland) and 15 parts by weight phenylglycidyl ether, an epoxy resin consisting of 100 parts by weight "DER 331" (Dow Chemical Co.) and 65 parts by weight tetrahydrophthalic acid anhydride or 100 parts by weight of epoxynovolak "DEN 438" (Dow Chemical Co.) and 3 parts by weight of the boron trifluoride complex "HZ 935 J 50" (Ciba Geigy AG).

Instead of making the main insulation 29 of a wrapping of mica tapes, the main insulation in the case described above can be made from an insulating tape which is provided with a protective layer according to the present invention, this insulating tape being wound a large number of turns with half an overlap around the conductor bundle 21. If tapes in accordance with Examples 1-3 and 6-9 are used, for example in a width of 25 mm, the protective layer—if one protective layer 11 is used—faces outwards. Prior to the winding, the tape is provided with a coating of a resinous binder of any of the kinds as exemplified in the description of the application of a mica tape as main insulation. After the winding, the resin is cured with the wound coil by heating in a forming tool. If instead tapes in accordance with Example 4 or 5 are used, the protective layer 11, as before, faces outwards. In this case no coating of a resinous binder is needed but the layer 12 in the exemplified case, consisting of fluorinated ethylenepropylene polymer, can be used as binder. After the winding of the tape, the wound bundle is placed in a forming tool and is heated to 150° C. for a time sufficient for the turns of the tape in the wrapping to bind to each other and for the innermost turn of the tape to bind to the conductor bundle.

If, in the manner described, the main insulation is made of an insulating tape which is provided with a protective layer according to the present invention, the main insulation can be made thinner than when using mica tapes, thus attaining a gain of space. It is also possible to use a main insulation of this kind together with an insulation for the individual conductor of a conventional kind, for example in the form of a wrapping of glass yarn which is impregnated with a binder or of an enamel layer only of such a type as is normally used when enamelling electric conductors such as terephthalic acid alkyds, polyimides, polyamideimides, etc., or together with an insulation of the kind described in Swedish patent application 8701214-2 entitled "Electrical conductor provided with a surrounding insulation" filed concurrently herewith, in which the insulation is surrounded by a protective layer consisting of an organic polymer containing chromium oxide or iron oxide or a mixture of chromium oxide and iron oxide.

Figure 6:
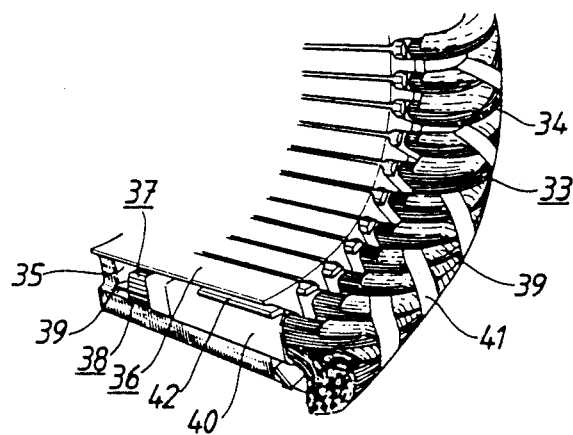
FIG. 6 shows in perspective and partially in section a part of a stator with a random wound winding in which is used an insulating material according to the present invention.

An insulating material according to the present invention is also suited as insulating material in electrical machines with random wound windings, in which brief steep overvoltages occur such as in machines for frequency convertor operation. The over-voltages may cause high stresses, among other things on slot insulations between winding and stator iron and on phase insulations between coils for different phases in the winding. FIG. 6 illustrates the use of the insulating materials in the electrical machines mentioned. In accordance with this figure, the winding 33 of round enamelled wire 34 is arranged in slots 35 in the stator 36 of the machine. Between the coils 37 and 38 for different phases in the same slots, phase insulations 39 are arranged and around coils in the same slots slot insulations 40 are arranged. Those parts of the winding which are located outside the stator slots are supported by bands 41 of, for example, woven glass fibre and the parts which are located in the stator slots are secured in the slots by slot wedges 42 of, for example, glass fibre reinforced plastic.

The phase insulations 39 and the slot insulations 40 may, among other things, consist of any of the insulating materials described in Examples 1-9 in a width suitable for the use.

We claim:

1. A flexible tape-formed or sheet-formed electrical insulating material comprising an insulating layer in the form of a homogeneous film of an organic polymer or in the form of a felt or a paper of fibres of an organic polymer, said insulating layer having a thickness of 10 to 500 microns, and a protective layer on at least one side of the insulating layer for protecting the insulating layer against degradation caused by corona, said protective layer comprising an organic polymer containing at least 10 percent by volume of a powdered filler in the form of chromium oxide ($Cr_2O_3$), iron oxide ($Fe_2O_3$) or a mixture of chromium oxide ($Cr_2O_3$) and iron oxide ($Fe_2O_3$).

2. Electrical insulating material according to claim 1, wherein the powdered material in the protective layer has an intrinsic resistivity of $10^4$-$10^8$ ohm m.

3. Electrical insulating material according to claim 1, wherein the protective layer has a thickness and the protective layers together have a thickness, respectively, which is less than the thickness of the insulating layer.

4. Electrical insulating material according to claim 1, wherein the protective layer has a resistivity in excess of $10^{10}$ ohm m.

5. Electrical insulating material according to claim 1, wherein the content of chromium oxide, iron oxide or a mixture of chromium oxide and iron oxide constitutes 10–40% of the volume of the protective layer.

6. Electrical insulating material according to claim 1, wherein the content of chromium oxide, iron oxide or a mixture of chromium oxide and iron oxide constitutes 10–30% of the volume of the protective layer.

7. Electrical insulating material according to claim 1, wherein the insulating layer comprises two layers, secured to each other, of different organic polymers.

8. Electrical insulating material according to claim 1, wherein the organic polymer in the protective layer consists of a cured resinous binder.

9. A flexible tape-formed or sheet-formed electrical insulating material comprising an insulating layer in the form of a homogenous film of an organic polymer or in the form of a felt or a paper of fibres of an organic polymer, said insulating layer having a thickness of 10 to 500 microns, and a protective layer on at least one side of the insulating layer for protecting the insulating layer against degradation caused by corona, said protective layer comprising an organic polymer selected from the group consisting of terephthalic acid alkyds, polyesterimides, polyamideimides, polyimides, polyurethanes, epoxy resins, polysulphons, polyamides, polymers based on polyhydantoin, and unsaturated resins and containing at least 10 percent by volume of a powdered filler in the form of chromium oxide ($Cr_2O_3$), iron oxide ($Fe_2O_3$) or a mixture of chromium oxide ($Cr_2O_3$) and iron oxide ($Fe_2O_3$).

10. Electrical insulating material according to claim 9, wherein the powdered material in the protective layer has an intrinsic resistivity of $10^4$–$10^8$ ohm m.

11. Electrical insulating material according to claim 9, wherein the protective layer has a thickness and the protective layers together have a thickness, respectively, which is less than the thickness of the insulating layer.

12. Electrical insulating material according to claim 9, wherein the protective layer has a resistivity in excess of $10^{10}$ ohm m.

13. Electrical insulating material according to claim 9, wherein the content of chromium oxide, iron oxide or a mixture of chromium oxide and iron oxide constitutes 10–40% of the volume of the protective layer.

14. Electrical insulating material according to claim 9, wherein the content of chromium oxide, iron oxide or a mixture of chromium oxide and iron oxide constitutes 10–30% of the volume of the protective layer.

15. Electrical insulating material according to claim 9, wherein the insulating layer comprises two layers, secured to each other, of different organic polymers.

16. Electrical insulating material according to claim 9, wherein the organic polymer in the protective layer consists of a cured resinous binder.

17. The combination of an elongated electrical conductor and an insulating material applied around said conductor along at least substantially its entire length, said insulating material being tape-formed or sheet-formed and comprising an insulating layer in the form of a homogeneous film of an organic polymer or in the form of a felt or a paper of fibres of an organic polymer, said insulating layer having a thickness of 10 to 500 µm, and a protective layer on at least one side of the insulating layer for protecting the insulating layer against degradation caused by corona, said protective layer comprising an organic polymer containing at least 10 percent by volume of a powdered filler in the form of chromium oxide ($Cr_2O_3$), iron oxide ($Fe_2O_3$) or a mixture of chromium oxide ($Cr_2O_3$) and iron oxide ($Fe_2O_3$).

18. The combination as claimed in claim 17, wherein the conductor comprises a bundle of several conductor lengths which are electrically insulated from each other.

19. The combination as claimed in claim 17, wherein the powdered material in the protective layer has an intrinsic resistivity of $10^4$–$10^8$ ohm m.

20. The combination as claimed in claim 17, wherein the protective layer has a resistivity in excess of $10^{10}$ ohm m.

21. The combination as claimed in claim 17, wherein the organic polymer in the protective layer consists of a cured resinous binder.

22. The combination of an elongated electrical conductor and an insulating material applied around said conductor along at least substantially its entire length, said insulating material being tape-formed or sheet-formed and comprising an insulating layer in the form of a homogeneous film of an organic polymer, said insulating layer having a thickness of 10 to 500 µm, and a protective layer on at least one side of the insulating layer for protecting the insulating layer against degradation caused by corona, said protective layer comprising an organic polymer selected from the group consisting of terephthalic acid alkyds, polyesterimides, polyamideimides, polyimides, polyurethanes, epoxy resins, polysulphons, polyamides, polymers based on polyhydantoin, and unsaturated resins and containing at least 10 percent by volume of a powdered filler in the form of chromium oxide ($Cr_2O_3$), iron oxide ($Fe_2O_3$) or a mixture of chromium oxide ($Cr_2O_3$) and iron oxide ($Fe_2O_3$).

23. The combination as claimed in claim 22, wherein the conductor comprises a bundle of several conductor lengths which are electrically insulated from each other.

24. The combination as claimed in claim 22, wherein the powdered material in the protective layer has an intrinsic resistivity of $10^4$–$10^8$ ohm m.

25. The combination as claimed in claim 22, wherein the protective layer has a resistivity in excess of $10^{10}$ ohm m.

26. The combination as claimed in claim 22, wherein the organic polymer in the protective layer consists of a cured resinous binder.

* * * * *